United States Patent Office 3,412,137
Patented Nov. 19, 1968

3,412,137
PROCESS FOR THE PREPARATION
OF NITRILES
Joseph W. Stutts, Jackson, Ala., assignor to Geigy Chemical Company, Greenburgh, N.Y., a corporation of Delaware
No Drawing. Filed Oct. 14, 1965, Ser. No. 496,179
6 Claims. (Cl. 260—465.5)

ABSTRACT OF THE DISCLOSURE

Process for the preparation of iminodiacetonitrile by reacting hexamethylenetetramine, with about 6 molar equivalents of hydrogen cyanide in a buffered aqueous medium at a pH of from about 5 to about 6.5 and at a temperature of between about 0° and about 75° C. In a preferred embodiment the buffer comprises about 1.5 moles of acetic acid per mole of hexamethylenetetramine and the temperature ranges from about 40° to about 50° C.

---

This invention relates to the preparation of an organic nitrogen compound. More particularly, it relates to a process to prepare commercial quantities of iminodiacetonitrile in high yield and purity, quickly, with relatively inexpensive batch type equipment. Iminodiacetonitrile is of substantial use to industry, serving as an intermediate in the preparation of surface active agents, complex salts, chelating agents, and the like.

It was reported over seventy years ago that iminodiacetonitrile is obtained in unspecified yield from the reaction of hydrogen cyanide with hexamethylenetetramine. Eschweiler, Ann., 278 (1894). Later, in 1921, Dubsky et al., Ber., 54, 2659, reported that two days after treating hexamethylenetetramine with aqueous hydrogen cyanide it was possible to isolate iminodiacetonitrile in a calculated 57.6% yield (based on formaldehyde). In 1957, in U.S. 2,794,044, Miller disclosed the preparation of iminodiacetonitrile in yields of up 65%, in 10 to 24 hours rather than the two days of Dubsky et al., if ammonia, formaldehyde and hydrogen cyanide are reacted together in aqueous acid solution having a pH of 5.5 to 6.5. Recently, in U.S. 3,167,580, Saunders et al. show in examples that iminodiacetonitrile is obtained rapidly in yields ranging from 55 to 65% (based on formaldehyde) in a continuous process comprising bringing into reactive contact acid stabilized formaldehyde, hydrogen cyanide and ammonia under carefully controlled reactant ratios and temperatures and at a pH of greater than 7. Thus, at the present state of the art, a batch process is known to provide iminodiacetonitrile from hexamethylenetetramine and hydrogen cyanide in 58% yield in two days, and two alternative processes have been proposed to prepare iminodiacetonitrile in shorter time and in improved yield. However, both alternatives require reacting together three components, namely, ammonia, formaldehyde and hydrogen cyanide. One of them, a batch process, while reducing the reaction time substantially, provides only a moderate increase in yield at the expense of using three instead of two reactants. The second and more recent alternative, while reducing reaction time still further, requires also the use of three reactants instead of two, and a specially adaptable apparatus which permits continuous withdrawal of product solution at a rate effective to maintain a contact period of less than about ten minutes while still holding very critical reactant ratios, temperatures and pH levels. Exemplary yields in this second alternative are still only of the order of 55 to 75%, and the desired product contains substantial quantities (8.4–25.1%) of a less-desirable byproduct, glycinonitrile. Now it has been found possible to prepare iminodiacetonitrile in yields as high as 80.5% in as little as two hours, in simple and commonly available batch type equipment, said iminodiacetonitrile being substantially free of impurities and usable for most purposes without the need for recrystallization or other purification steps.

The foregoing advantages are readily achieved by practice of the method of the instant invention which is, in essence: In a process for the preparation of iminodiacetonitrile by bringing hydrogen cyanide into reactive contact with hexamethylenetetramine, the improvement which comprises causing said contact to occur in a buffered aqueous medium at a pH of from about 5 to about 6.5.

Special mention is made of two especially preferred embodiments of the instant invention: these comprise using, respectively, acetic acid and phosphoric acid to buffer the said aqueous medium.

An embodiment of the instant invention, which provides especially pure product in especially high yield, contemplates a process for the preparation of iminodiacetonitrile which comprises reacting together an aqueous solution of hexamethylenetetramine, buffered at a pH of from about 5 to about 6.5 with about 1.5 moles of acetic acid per mole of said hexamethylenetetramine, and about 6 molar equivalents of hydrogen cyanide based on said hexamethylenetetramine at a temperature of from about 40° to about 50° C. until formation of iminodiacetonitrile is substantially complete and recovering the said iminodiacetonitrile.

Also contemplated as embodiments of the instant invention are processes including the above steps and the additional step of recovering iminodiacetonitrile.

It is critical in achieving the advantages of the instant invention that the reaction be carried out in a buffered aqueous medium. In this specification, and in the appended claims, the term "buffered" is used in its art-recognized sense. Hackh's Chemical Dictionary, 3rd Edition, 1944, p. 146. A buffer is broadly any substance which, when added to a solution, resists any change in hydrogen ion concentration on addition of acid or alkali. The buffered aqueous solutions in which the processes of this invention are carried out are thus solutions in water of weak acids or salts thereof, such as acetates, borates, phosphates, phthalates, and like buffers. Especially preferred as buffers because of ease of handling, efficiency and economy are acetic acid and phosphoric acid.

The amount of buffer required to be added to the instant reaction mixtures will be determined by the need to maintain control of pH at the critical range of from about 5 to about 6.5 and, as will be obvious to those skilled in the art, this will depend on the amount of basic byproduct formed in the reaction. In this connection, if acetic acid is used as the buffer, about 1.5 molar equivalents based on hexamethylenetetramine is about optimum in a process which appears to involve the following overall equation :

$$(CH_2)_6N_4 + 6HCN + HOAc \rightarrow 3HN(CH_2CN)_2 + NH_4OAc$$

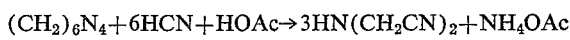

wherein $(CH_2)_6N_4$ is hexamethylenetetramine and HOAc is acetic acid.

The concentration of the reactants in this process is not particularly critical. It has been found to be especially convenient to use two parts of water per part of hexamethylenetetramine. If this then is buffered with 1.5 molar equivalents of glacial acetic acid, based on hexamethylenetatramine, an especially advantageous concentration is obtained, for the reason that one hour after treating the mixture with 6 molar equivalents of liquid hydrogen cyanide, based on hexamethylenetetramine, merely diluting with a second portion of water equal to the first and cooling the reaction mixture to about 5° C. causes the precipitation of iminodiacetonitrile in especially good purity, in high yield. In commercial operation, it is necessary only to filter the cooled reaction mixture to recover the product and to wash the product with a minimum amount of cold water.

The pH at which the reaction is carried out appears to be critical to obtain the advantageous results. Any variation tending to leave the range of from about pH 5 to about pH 6.5 appears to give lower yields and poorer quality and, in extreme cases, causes a complete loss of the batch.

It has been found that the periodic addition of strong non-buffering acids, such as sulfuric acid, during the reaction can be used to maintain pH control. However, whether or not a strong acid is used, it is obvious that the process is required to be carried out in a closed system due to the hazardous nature of hydrogen cyanide. With the periodic addition of strong mineral acid as a means to control pH, it is therefore necessary to provide the closed reaction vessel with remotely-indicating pH instrumentation, the precision of which is always rather doubtful and the sensing devices of which are subject to breakage and failure. Since the instant process employs buffers to control pH, the reaction, in addition to giving high yields, is made simpler because there is no need for simultaneous pH measurement and acid additions.

The reaction temperature is not particularly critical and may be varied to some considerable extent. It is convenient to operate between about 0° and about 75° C. However, for obtaining the best yields in the shortest possible time, without losses due to volatilization, it is preferred to carry out the process in a temperature range of from about 35 to about 55° C., and it is especially preferred to employ a temperature in the range of from 40° to 50° C. If, for example, the reaction mixture is maintained at 45±5° C., and 80.5% yield of iminodiacetonitrile is realized in only 2 hours and 15 minutes.

The following examples are illustrative of the processes of the instant invention and are not to be construed as being limiting in any manner whatsover.

EXAMPLE I

One mol of hexamethylenetetramine, 140 g., is dissolved in 250 ml. of water and buffered with 1.5 moles, 90 g., of glacial acetic acid. The batch is heated to 40°C. and held at 40–50°C. with a slight amount of cooling during one hour and 15 minutes while 6.0 moles, 162 g., of liquid hydrogen cyanide is added. The reaction mixture before, during, and after addition of the hydrogen cyanide has a pH of 5.5. The reaction mixture is maintained for an additional hour at 40–50°C. It is then diluted with 250 ml. of water and cooled to 5° C. The precipitated product is removed by filtration, washed with a small amount of cold water and dried. Iminodiacetonitrile is obtained in high purity. The product weighs 229 g., yield, 80.5%, based on hexamethylenetetramine. This product is eminently suitable for conversion directly to iminodiactic acid in high yield.

EXAMPLE II

The procedure of Example I is repeated substituting 1.2 moles of hexamethylenetetramine for 1.0 mole, maintaining the other reaction conditions the same. The pH of the 79.5% yield.

EXAMPLE III

The procedure of Example I is repeated using instead of 1.5 molar equivalents of acetic acid, 1.2 molar equivalents based on hexamethylenetetramine. The pH of the mixture is buffered at 5.5–6.0. Iminodiacetonitrile is obtained in good quality at 73% yield.

EXAMPLE IV

The procedure of Example I is repeated substituting for acetic acid, 85% phosphoric acid as the buffer. When 0.965 molar equivalent of phosphoric acid based on hexamethylenetetramine is used, the reaction is maintained at pH 6.2 and iminodiacetonitrile is obtained in 76.3% yield. If 0.5 molar equivalents of phosphoric acid is used, the reaction mixture pH is maintained at 6.2 and the product is obtained in 77% yield.

What is claimed is:
1. A process for the preparation of iminodiacetonitrile which comprises reacting hexamethylenetetramine with about 6 molar equivalents of hydrogen cyanide based on said hexamethylenetetramine in a buffered aqueous medium at a pH of from about 5 to about 6.5 and at a temperature of between about 0° and about 75° C.
2. The process defined in claim 1 wherein said aqueous medium is buffered with acetic acid.
3. The process defined in claim 1 wherein said aqueous medium is buffered with phophoric acid.
4. The process of claim 1 including the additional step of recovering iminodiacetonitrile from the aqueous solution.
5. The process defined in claim 1 wherein said temperature is between about 35° and about 55° C.
6. A process for the preparation of iminodiacetonitrile which comprises reacting together an aqueous solution of hexamethylenetetramine, buffered at a pH of about 5 to 6.5 with about 1.5 moles of acetic acid per mole of said hexamethylenetetramine, and about 6 molar equivalents of hydrogen cyanide based on said hexamethylenetetramine at a temperature of from about 40° to about 50°C. until formation of iminodiacetonitrile is substantially complete and recovering said iminodiacetonitrile.

References Cited
UNITED STATES PATENTS

| | | | |
|---|---|---|---|
| 2,794,044 | 5/1957 | Miller | 260—465.5 |
| 3,167,582 | 1/1965 | Saunders et al. | 260—465.5 |
| 3,256,314 | 6/1966 | Dovell, et al. | 260—465.5 |

OTHER REFERENCES

Groggins, "Unit Processes in Organic Chemistry," 5th edition, 1958, page 425, QD–262–G7, 1958.

JOSEPH P. BRUST, *Primary Examiner.*